(No Model.)

W. J. & E. FREEMAN.
MEANS FOR CONNECTING SOIL PIPES.

No. 545,477. Patented Sept. 3, 1895.

Witnesses
J. Madigan
E. van Wulven

Inventors
W. J. Freeman
E. Freeman
per T. E. Halford
attorney

UNITED STATES PATENT OFFICE.

WILLIAM JAMES FREEMAN AND EDWIN FREEMAN, OF LONDON, ENGLAND.

MEANS FOR CONNECTING SOIL-PIPES.

SPECIFICATION forming part of Letters Patent No. 545,477, dated September 3, 1895.

Application filed September 17, 1894. Serial No. 523,271. (No model.) Patented in England August 1, 1893, No. 14,760.

*To all whom it may concern:*

Be it known that we, WILLIAM JAMES FREEMAN and EDWIN FREEMAN, subjects of the Queen of Great Britain, residing at 99 York Road, Battersea, London, in the county of London, England, have invented new and useful Improvements in Means for Connecting Soil and other Discharge Pipes to Traps, (for which we have obtained a patent in Great Britain bearing date August 1, 1893, No. 14,760,) of which the following is a specification.

Our invention relates to a novel means of connecting the outgo-pipes from bath, closet, and other traps to the vertical soil or waste pipes, and the object thereof is to facilitate the connection of the said traps to the vertical pipes in such a manner that all joints between the trap and the vertical waste-pipes shall be absolutely gas-tight, and in the case of the vertical pipe all joints may be caulked with lead.

Now, according to this invention, we form the end of the outgo of the trap with a screw-thread thereon, and we connect the soil-pipe inside the building thereto by means of a screwed collar bearing against a flange on the end of the said pipe, a washer being interposed between the end of the pipe and the trap to make a staunch joint. The other end of the length of pipe inside the building is soldered to a connecting-pipe formed of iron, copper, or other suitable metal, lined with lead, if necessary, the upper end of the said connecting-pipe being formed with a socket to receive the next length of vertical discharge-pipe above it or the ventilating-shaft, the lower end of the connection being formed into a spigot to engage with the socket of the length of discharge-pipe next below it.

In order that our said invention may be fully understood, we will proceed to explain the same with reference to the accompanying sheet of drawings, in which—

Figure 1:
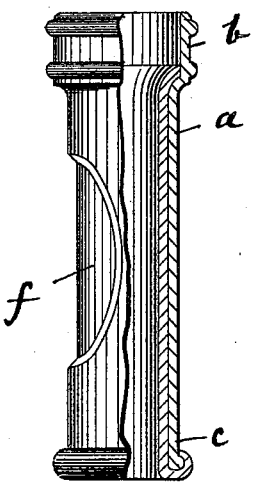
Figure 2:
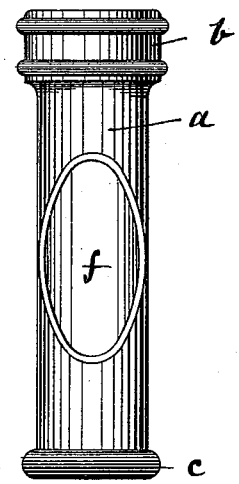
Figure 3:
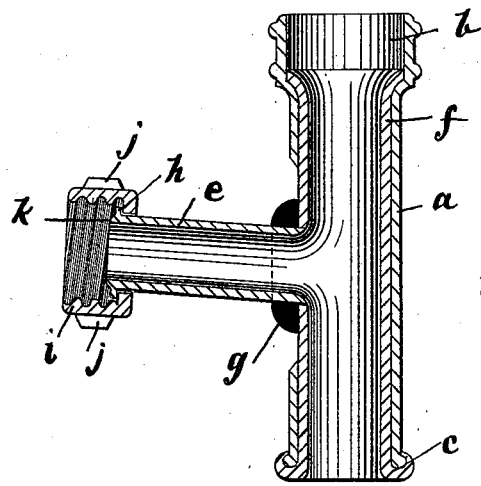
Figure 4:
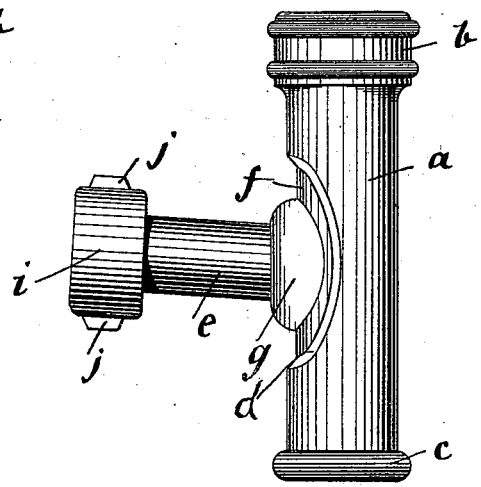

Figure 1 represents a side elevation of lead-lined iron pipe to connect soil-pipe to ventilating-shaft. Fig. 2 is a front view of same ready for use. Fig. 3 is a section, and Fig. 4 a side elevation, of same with connection to closet-trap attached.

The same letters denote the same part in all the figures.

$a$ is a short length of metal tube, having a socket $b$ at one end and a spigot $c$ at the other end.

$d$ is an orifice in the side of the metal pipe to admit of the insertion of the length of soil-pipe $e$, connecting the outgo of the closet-trap with the vertical soil-pipe outside the building.

$f$ is a lead lining turned over the lower edge of the pipe $a$ and tafted into the socket $b$, as shown at Figs. 1 and 3.

The edges of the orifice $d$ are beveled to facilitate the joining of the pipe $e$ to the lining $f$. An orifice is cut in the lead lining to admit the end of the pipe $e$, and the two are screwed together air-tight by means of a wiped joint $g$. The spigot end $c$ of the pipe $a$ is inserted in the socket of the soil-pipe below it, and the spigot end of the soil-pipe or ventilating-shaft above it is inserted in the socket $b$, and the joints between the spigots and sockets caulked with lead to insure gas-tight joints. The inner end of the pipe $e$ has a flange $h$ formed thereon, against which bears a collar $i$ having an internal screw-thread therein which engages with a similar external thread on the outgo of the closet-trap.

$j j$ are lugs to receive a spanner or wrench to enable the collar to be screwed up tight, a washer being inserted between the end of the trap and the flange $h$ to make the joint.

The end of the pipe $e$ may be brought to a feather-edge, as shown at $k$, Fig. 3, to prevent leakage of gas between the washer and the end of the pipe $e$.

Although we have described our invention as applied to closet-basins and soil-pipes, yet we do not limit it to this purpose only, as the same is applicable to sink and bath waste pipes and traps. Also, in some cases, if the pipe $a$ is formed of copper or brass tinned on the outside, the lead lining may be dispensed with.

Having fully described our invention, what we claim, and desire to secure by Letters Patent, is—

1. In a means for connecting discharge pipes to traps and as a new article of manufacture the metal spigot and socket pipe $a$ having an orifice in the side thereof and a lead lining $f$ the parts being so arranged that a branch may be soldered to said lining through said orifice substantially as described and for the purpose stated.

2. In a means for connecting discharge pipes to traps the combination of a spigot and socket pipe *a* having an orifice in the side thereof and a lead lining *f* with a pipe *e* attached at one end to the said lining and provided with a flange at the other end and an internally screwed collar bearing, on the said flange all substantially as specified and for the purpose stated.

WILLIAM JAMES FREEMAN.
EDWIN FREEMAN.

Witnesses:
T. E. HALFORD,
H. C. FOWLER.